United States Patent
Biem

(10) Patent No.: US 10,452,983 B2
(45) Date of Patent: Oct. 22, 2019

(54) DETERMINING AN ANOMALOUS STATE OF A SYSTEM AT A FUTURE POINT IN TIME

(71) Applicant: INTERNATIONAL BUSINESS MACHINES CORPORATION, Armonk, NY (US)

(72) Inventor: Alain E. Biem, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 658 days.

(21) Appl. No.: 14/823,649

(22) Filed: Aug. 11, 2015

(65) Prior Publication Data
US 2015/0347217 A1   Dec. 3, 2015

Related U.S. Application Data

(63) Continuation of application No. 13/904,502, filed on May 29, 2013, now Pat. No. 9,218,570.

(51) Int. Cl.
| | |
|---|---|
| *G06E 1/00* | (2006.01) |
| *G06F 11/07* | (2006.01) |
| *G06N 5/02* | (2006.01) |
| *G06N 5/04* | (2006.01) |

(52) U.S. Cl.
CPC .......... *G06N 5/046* (2013.01); *G06F 11/079* (2013.01); *G06F 11/0721* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 7,203,431 B2 | 4/2007 | Shoji et al. | |
| 7,761,389 B2 | 7/2010 | Medasani et al. | |
| 8,109,543 B2 | 5/2012 | Kaushal et al. | |
| 8,200,797 B2 | 6/2012 | Meng et al. | |
| 2004/0039968 A1 | 2/2004 | Hatonen et al. | |
| 2006/0106743 A1 | 5/2006 | Horvitz | |
| 2007/0088448 A1 | 4/2007 | Mylaraswamy et al. | |
| 2007/0233435 A1* | 10/2007 | Bradski | G06F 17/18 703/2 |

(Continued)

OTHER PUBLICATIONS

Chan et al, Modeling Multiple Time Series for Anomaly Detection, 2005.*

(Continued)

*Primary Examiner* — Li B. Zhen
*Assistant Examiner* — Mikayla Chubb
(74) *Attorney, Agent, or Firm* — David Zwick; Matthew M. Hulihan; Heslin Rothenberg Farley & Mesiti PC

(57) ABSTRACT

A prediction technique to predict an anomalous state of a processing environment at a future point in time. One or more values of one or more metrics of the processing system are obtained. For the one or more metrics, one or more predicted values are determined for one or more points in time in the future. Based the predicted values, one or more change values for one or more points in time are determined, and based on the one or more change values, a determination is made as to whether an anomalous state exists within the processing system.

16 Claims, 8 Drawing Sheets

(56) References Cited

U.S. PATENT DOCUMENTS

| | | | |
|---|---|---|---|
| 2010/0185499 A1* | 7/2010 | Dwarakanath | G06Q 10/04 705/7.31 |
| 2011/0054806 A1* | 3/2011 | Goldfine | G07C 3/00 702/34 |
| 2011/0119226 A1 | 5/2011 | Ruhl et al. | |
| 2011/0119374 A1 | 5/2011 | Ruhl et al. | |
| 2011/0185422 A1* | 7/2011 | Khayam | H04L 63/1425 726/23 |
| 2011/0313726 A1 | 12/2011 | Parthasarathy et al. | |
| 2012/0066166 A1 | 3/2012 | Curbera et al. | |
| 2013/0041644 A1 | 2/2013 | Cremonesi et al. | |
| 2013/0173218 A1 | 7/2013 | Maeda et al. | |
| 2013/0184838 A1 | 7/2013 | Tchoryk, Jr. et al. | |
| 2013/0204808 A1 | 8/2013 | Jiang et al. | |
| 2014/0108324 A1 | 4/2014 | Chen et al. | |
| 2014/0108640 A1 | 4/2014 | Mathis | |
| 2014/0142727 A1 | 5/2014 | Giering et al. | |
| 2014/0195184 A1 | 7/2014 | Maeda et al. | |
| 2014/0279779 A1 | 9/2014 | Zou et al. | |
| 2014/0324739 A1 | 10/2014 | Claussen et al. | |

OTHER PUBLICATIONS

Wang et al, A New Scheme for Improving the Seasonal Prediction of Summer Precipitation Anomalies, 2008.*

Ampah et al., "An Intrusion Detection Technique Based on Discrete Binary Communication Channels," Intrusion Detection System, Mar. 2011, pp. 255-276.

Burgess, Mark, "A Tiny Overview of CFENGINE: Convergent Maintenance Agent," 1st International Workshop on Multi-Agent and Robotic Systems, MARS/INCINCO, Barcelona, Spain, Sep. 2005, pp. 1-8.

Metcalf et al., "Safeguards Envelope Progress FY08," Idaho National Laboratory INL/EXT-08-14915, Sep. 2008, pp. 1-29.

Steinwart et al., "A Classification Framework for Anomaly Detection," Journal of Machine Learning Research 6, Mar. 2005, pp. 211-232.

Biem, Alain E., "Detecting Anomalies in Real-Time in Multiple Time Series Data with Automated Thresholding," U.S. Appl. No. 13/535,743, filed Jun. 28, 2012, pp. 1-30.

Biem, Alain E., "Detecting Anomalies in Real-Time in Multiple Time Series Data with Automated Thresholding," U.S. Appl. No. 13/558,737, filed Jul. 26, 2012, pp. 1-33.

Office Action in U.S. Appl. No. 13/904,502, dated May 12, 2015, pp. 1-16.

Andrzejak et al., Predicting Machine Availabilities in Desktop Pools, 2006.

Bovenzi et al., A Statistical Anomaly-Based Algorithm for On-line Fault Detection in Complex Software Critical Systems, 2011.

Zhao et al., Equipment Fault Forecasting Based on ARMA Model, 2007.

* cited by examiner $$\text{PREDICTION TREND } (t+h) = \alpha \left( \sum_{i=0}^{h-1} |\hat{y}_{t+h|t+i+1} - \hat{y}_{t+h|t+i}| \right)$$

$\alpha$ PREDICTION TREND SCORE $(t+h)$ + $(1-\alpha)$ SEASON SCORE $(t+h)$

DETERMINING AN ANOMALOUS STATE OF A SYSTEM AT A FUTURE POINT IN TIME

CROSS REFERENCE TO RELATED APPLICATION

This application is a continuation of pending U.S. patent application Ser. No. 13/904,502, filed May 29, 2013, entitled, "DETERMINING AN ANOMALOUS STATE OF A SYSTEM AT A FUTURE POINT IN TIME", which is hereby incorporated herein by reference in its entirety.

BACKGROUND

One or more aspects relate, in general, to processing environments, and in particular, to detecting anomalies in such environments.

Large-scale hosting infrastructures and platforms form many processing environments including those having computing systems used in cloud computing and enterprise data centers, as examples. The size of these computing systems, the number of transactions that are performed by the systems, and the large amount of data processed render these systems vulnerable to anomalies. An anomaly is an unexpected change in incoming data or a pattern in the incoming data that deviates from the expected behavior. Anomalies arise from, for example, bottlenecks within the system, memory leaks, hardware failures, etc.

Monitoring data on complex computing systems for anomalies and recognizing anomalies in real-time prevent such anomalies from accumulating and effecting the efficiency of the system and, in a worse case scenario, causing the system, or a portion of the system, to fail. Monitoring such systems and detecting anomalous behavior from collected data streams, however, is not a trivial task. The large number of servers or processors, the traffic, the density of computational clusters and the complex interaction among system components pose serious monitoring and management challenges.

BRIEF SUMMARY

Shortcomings of the prior art are overcome and additional advantages are provided through the provision of a method of determining an anomalous state within a processing system. The method includes, for instance, obtaining, by a processor, one or more values of one or more metrics of the processing system; determining, by the processor, one or more sets of predicted values for one or more points in time in the future for one or more metrics, wherein a set of predicted values for a point in time in the future comprises one or more predicted values for the point in time in the future, and wherein the determining is based on one or more values of one or more metrics; determining, for one or more sets of predicted values, one or more change values, wherein a change value for a set of predicted values represents one or more changes in the set of predicted values; and determining, by the processor, at a current time, based on the one or more change values, whether an anomalous state exists within the processing system at a future time.

Systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects provide a capability to detect an anomalous state of a processing environment at a future point in time. Currently, anomaly detection or prediction systems compute an anomaly score that reflects the state of the environment at a given instant t. The anomaly score is usually a difference (residual) between the actual state of the environment and the expected state of the environment (normal state). Current anomaly detection systems require a form of ground truth, i.e., the actual state of the environment at the time of interest.

For instance, standard techniques of anomaly detection fall into the following categories:

A supervised setting: A system is trained on pre-defined anomalous patterns or symptoms of anomalies. This is a standard supervised prediction problem. This type of training is tied to particular types of anomalies or symptoms, and do not perform well when scoring data that differ from training data. They also do not perform well when there is a context change between training and testing conditions.

Symptoms-based techniques: These techniques make assumptions on the anomaly characteristics and detect assumed symptoms. These techniques require prior knowledge or some type of signatures.

Trends-prediction techniques: These techniques detect trends on the system behavior. The feature space is chosen to emphasize emerging behavior. Pre-processing is performed to emphasize trend and emerging patterns. These techniques are indirect techniques since the anomaly score is defined on the predicted trends space and not the actual data space. It is sensitive to the trend detection technique, and unreliable for long-term anomaly prediction.

In accordance with one or more aspects, a capability is provided to determine an anomaly score at a current time t that points to emerging problems at a future time t+h for any given h in real-time without specific examples of anomalies. Standard techniques to compute anomaly scores do not apply, since the actual state of the system is unknown at the predicted future t+h.

In one example, an unsupervised anomaly prediction is performed for any specified time horizon (interval) in the future. For instance, a predictive anomaly score is completed that points to anomalies at specified times in the future.

Figure 1A:
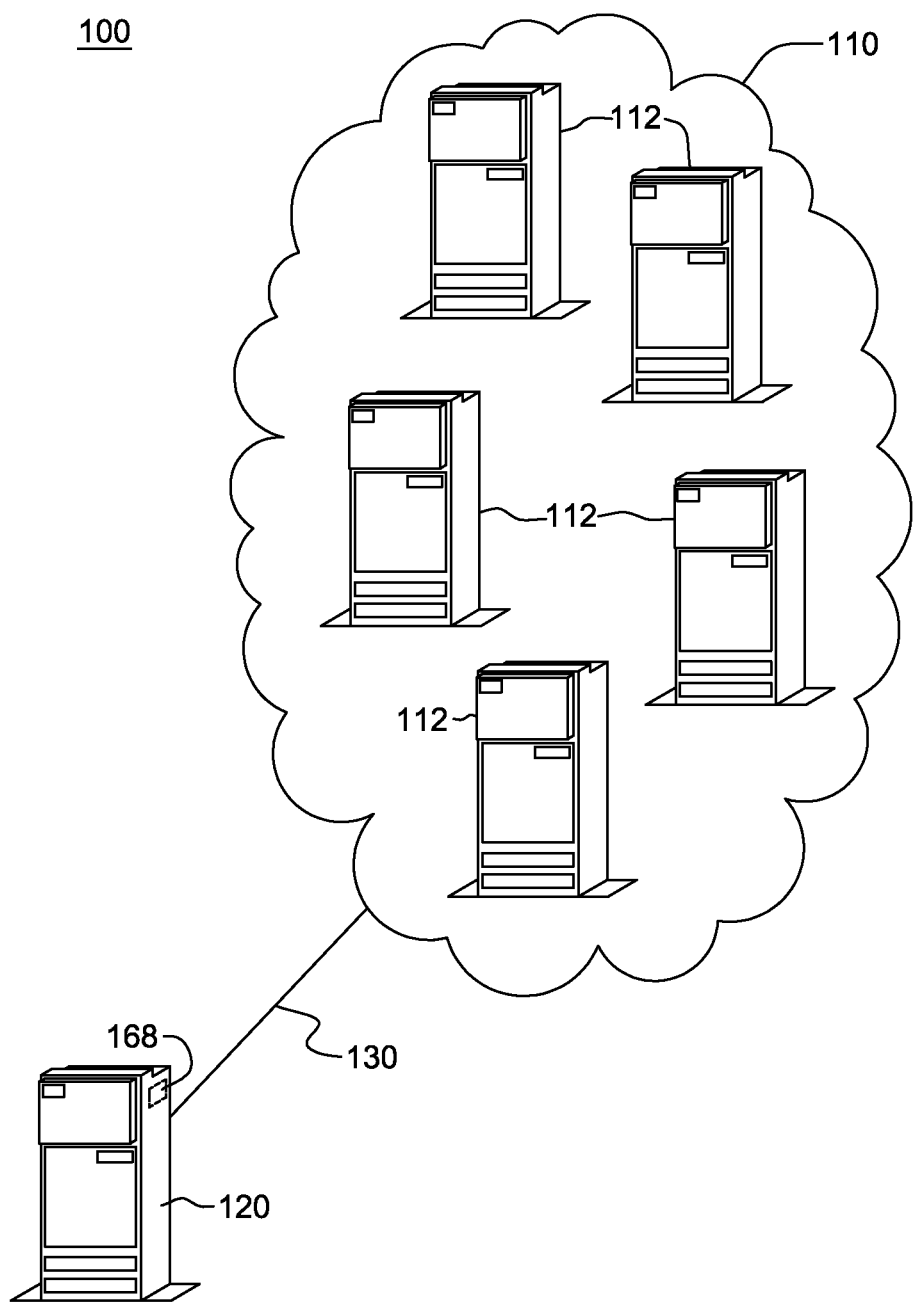
FIG. 1A depicts one example of a processing environment to incorporate and use one or more aspects of the present invention.

One embodiment of a processing environment to incorporate and use one or more aspects of the predictive future anomaly capability is described with reference to FIG. 1A. In one example, a processing environment 100 includes, for instance, a computing system 110, such as a cloud and/or an enterprise system, coupled to at least one server 120 via a connection 130. Connection 130 is, for instance, a network connection, including, but not limited to, a wireless and/or a wired connection.

In this embodiment, server 120 monitors computing system 110 and predicts anomalies for the system, as described in further detail herein. However, in other embodiments, the monitoring and/or predicting are performed by one or more computing units 112 of computing system 110. In yet a further embodiment, the monitoring and/or predicting are performed by the server and/or one or more of the computing units. That is, the predictive functionality may be centralized on one server or computing unit, or distributed among multiple servers and/or computing units.

Computing system 110 includes, for instance, one or more computing units 112, such as one or more servers or other types of computing units. One or more of the computing units may be coupled to one or more other computing units of the system or one or more of the computing units may be stand-alone units as compared to other units of computing system 110.

In one embodiment, one or more of computing units 112 is structurally similar to server 120, and an example of this structure is described with reference to FIG. 1B. Since, in this embodiment, the monitoring and prediction are performed by server 120, further details of server 120 are described. However, these details may equally apply to one or more of the computing units.

Figure 1B:
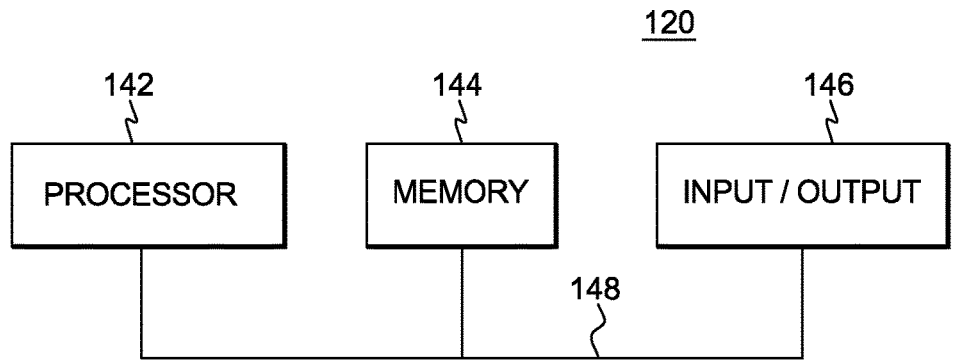
FIG. 1B depicts one embodiment of further details of a server of FIG. 1A.

Referring to FIG. 1B, in one embodiment, server 120 includes one or more processors 142 (e.g., central processing units), a memory 144, and one or more input/output devices and/or interfaces 146 coupled to one another via, for example, one or more buses 148 and/or other connections.

In one example, processor 142 is based on the Power Architecture offered by International Business Machines Corporation. One embodiment of the Power Architecture is described in "Power ISA™ Version 2.06 Revision B," International Business Machines Corporation, Jul. 23, 2010. POWER ARCHITECTURE® is a registered trademark of International Business Machines Corporation, Armonk, N.Y., USA. Other names used herein may be registered trademarks, trademarks, or product names of International Business Machines Corporation or other companies.

In a further embodiment, processor 142 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-09, Tenth Edition, September, 2012. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 142 is based on an Intel architecture offered by Intel Corporation. One embodiment of the Intel architecture is described in "Intel 64 and IA-32 Architectures Developer's Manual: Vol. 2A, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013. Intel® is a registered trademark of Intel Corporation, Santa Clara, Calif.

Figure 1C:
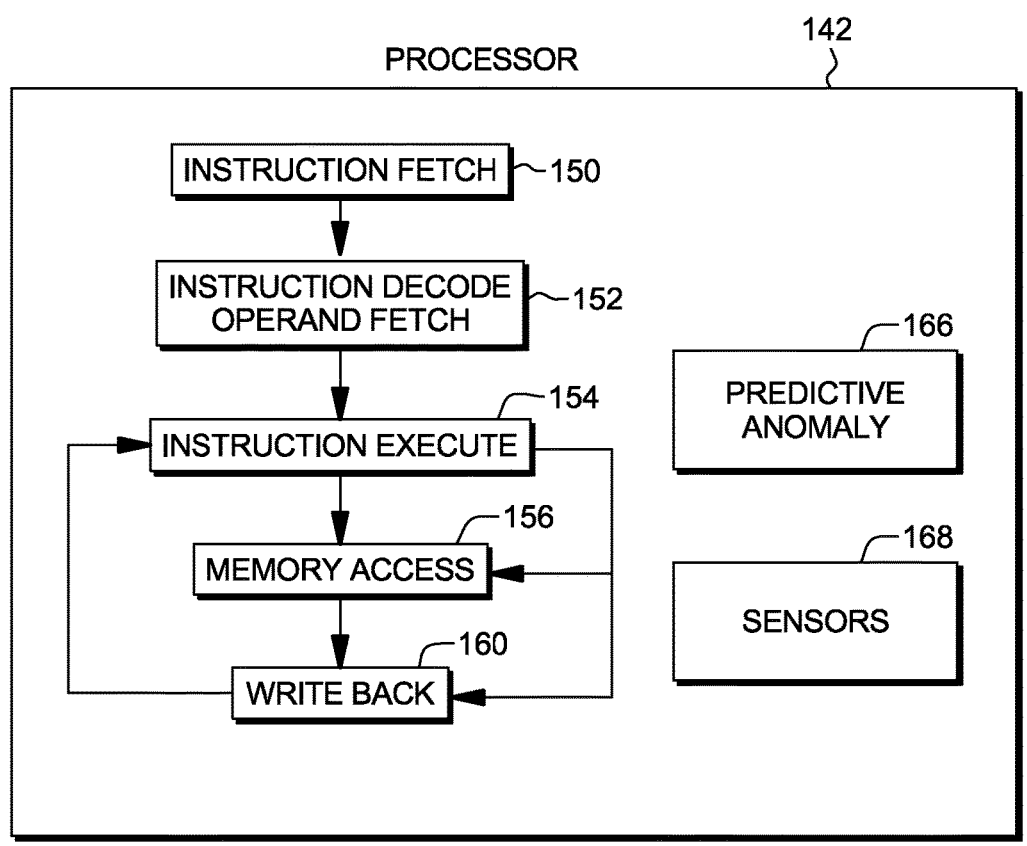
FIG. 1C depicts one embodiment of further details of a processor of FIG. 1B.

Processor 142 includes a plurality of functional components used to execute instructions. As depicted in FIG. 1C, these functional components include, for instance, an instruction fetch component 150 to fetch instructions to be executed; an instruction decode unit 152 to decode the fetched instructions and to obtain operands of the decoded instructions; an instruction execute component 154 to execute the decoded instructions; a memory access component 156 to access memory for instruction execution, if necessary; and a write back component 160 to provide the results of the executed instructions. One or more of these components may, in accordance with an aspect, provide predictive future anomaly functionality by including at least a portion of or have access to a predictive anomaly component 166.

Additionally, in one embodiment, processor 142 includes one or more sensor modules 168 (a.k.a., sensors) used to collect data regarding the computing system and to provide one or more metrics regarding the data, referred to as key performance indicators (KPIs). These metrics include, for instance, an average of the data, a standard deviation and/or other metrics. The data includes relevant data relating to the performance of the computing system, such as response time of the computing units, memory used, and/or number of transactions per a specified period of time, as examples. Other types of data may be collected depending on the processing system to be analyzed or other factors. Further, other types of metrics may be determined.

In a further embodiment, the sensors are separate from, but coupled to, the processor.

Figure 2A:
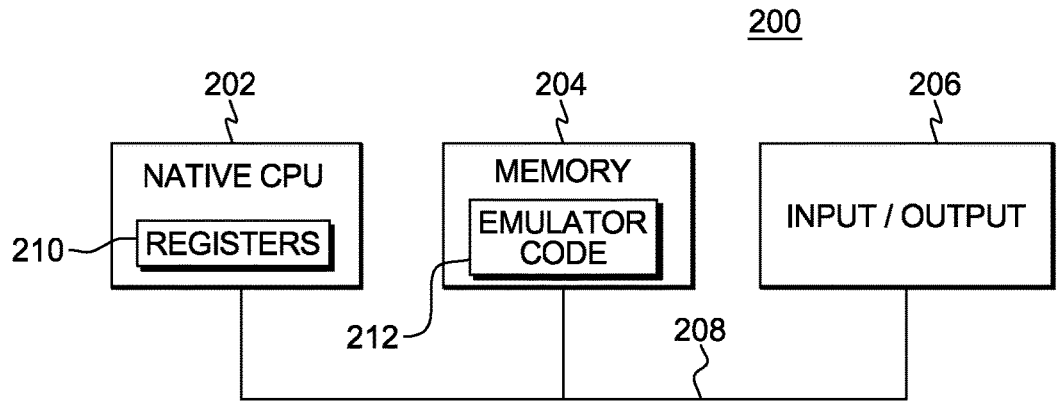
FIG. 2A depicts another example of a server to incorporate and use one or more aspects of the present invention.

Another embodiment of a server to incorporate and use one or more aspects is described with reference to FIG. 2A. In this example, a server 200, such as server 120, (or in another embodiment, a computing unit 112), includes, for instance, a native central processing unit 202, a memory 204, and one or more input/output devices and/or interfaces 206 coupled to one another via, for example, one or more buses 208 and/or other connections. As examples, server 200 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
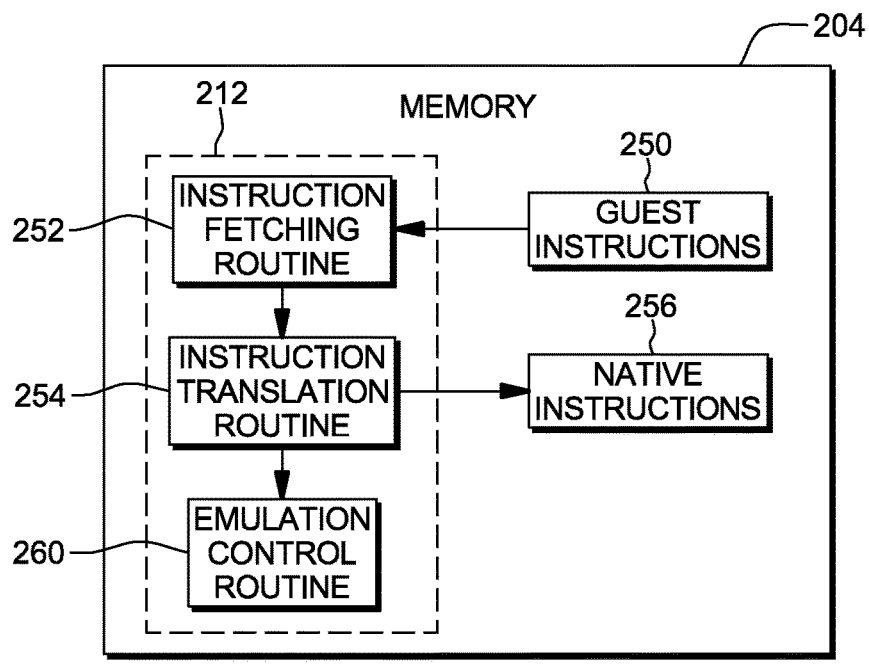
FIG. 2B depicts further details of one embodiment of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 142, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, the emulator code is used to monitor processing systems and to predict anomalies within such systems in a future time, as described herein.

One embodiment of the logic to predict anomalies of a processing system in a future time is described with reference to FIG. 3. This logic is performed, in one embodiment, by a server, such as server 120, or by another computing unit.

Figure 3:
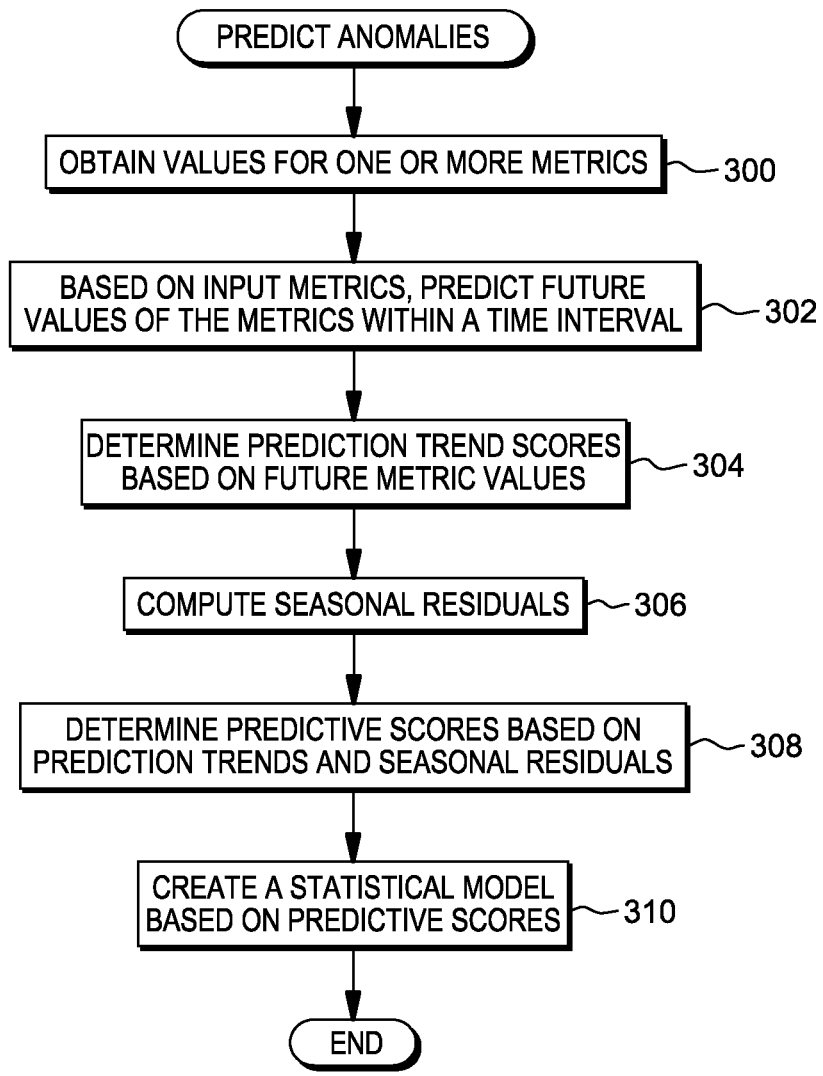
FIG. 3 depicts one embodiment of the logic to predict anomalies in a processing environment.

Referring to FIG. 3, initially, values for one or more metrics are obtained, STEP 300. For instance, the one or more sensors collect data in time series from one or more of the computing units. Time series is a sequence of data points, measured typically at successive time instants spaced at uniform time intervals. The data can be any type of data depending on the system being monitored. In this example, the data relates to the performance of the computing system, and thus, includes, for instance, response times, memory used, and/or number of transactions processed within a specified time period, etc. Based on this collected data, one or more values for one or more metrics relating to the collected data, such as the mean (e.g., average response time, average memory used, etc.), the standard deviation, etc., for each type of data collected, are computed.

Thereafter, based on the one or more metric values, future values of the metrics are predicted within one or more intervals of time, in the future, STEP 302. For instance, future values of the metrics within an interval (horizon) of time in the future [t+1, t+2, . . . , t+h] are computed, where t+1 is the interval of time after current time t, and t+h is h times the interval of time after time t. A new interval of predicted values is produced for each incoming metric.

In one embodiment, for each point in time for each metric, a set of predicted values is determined, in which the set includes one or more predicted values for that point in time. For example, assume a future time t+3 for a particular metric. For this future time, a first predicted value is predicted at a time t, a second predicted value is predicted at time t+1, and a third predicted value is predicted at time t+2. Thus, the set of predicted values for the point in time t+3 for this particular metric includes, for instance, the first, second and third predicted values for time t+3.

Then, based on the future metric values, one or more prediction trends scores are determined, STEP 304. For instance, for each timestamp in the future that has a predicted value at current time t, an average accumulated change of all predictions for a particular timestamp t+h in the future is computed for all h in the defined horizon. The accumulated change in the prediction is referred to as the prediction trends score. For instance, for time t+3, an average (e.g., weighted average) of the three predicted values is computed, and this average is the prediction trends score for time t+3 for a particular metric.

Further, in one embodiment, seasonal residuals are computed which takes into account past actual values, STEP 306. For instance, a sequence of residuals is computed as the difference between predicted values for a metric and the real values for the metric of a previous season. The season can be any time period, such as a day before, week before, year before, etc.

Thereafter, based on the prediction trends scores and the seasonal residuals, one or more predictive scores are obtained, STEP 308. For instance, for a point in time in the future, a prediction trend score for that point in time is combined (e.g., averaged) with a seasonal residual for that point in time to obtain a predictive score (a.k.a., anomaly score) for that point in time for a particular metric.

Further, a statistical model based on the predictive scores is created, which is used to predict whether there is an anomaly in the system in a future point of time, STEP 310. Further details regarding the logic for performing predictive anomaly detection is described with reference to FIGS. 4-7.

Figure 4:
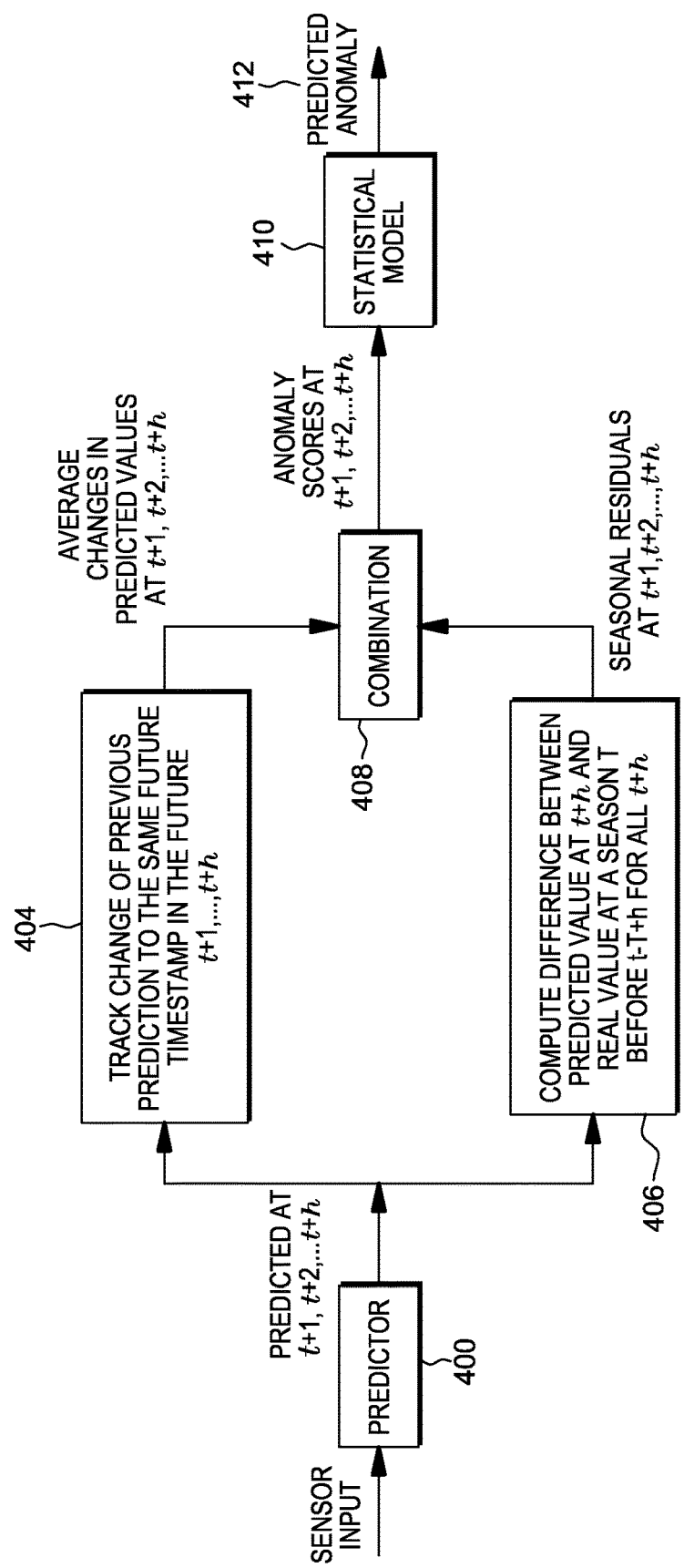
FIG. 4 depicts further details of one embodiment of predicting anomalies in a processing environment.
Figures 5A, 5B:
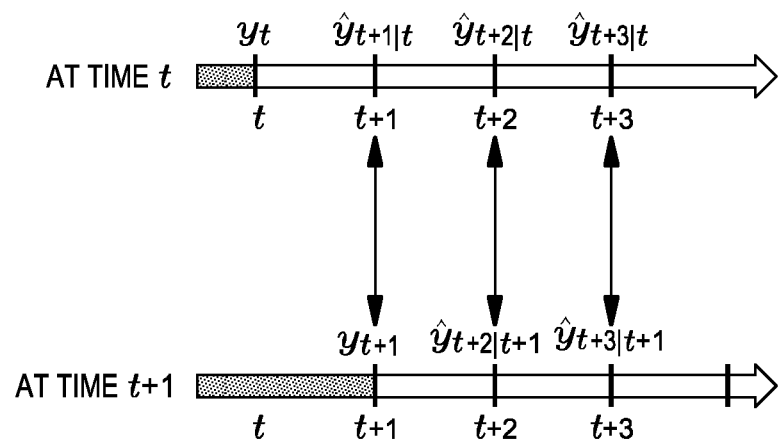
FIGS. 5A-5B depict one embodiment of determining a prediction trend score to be used in predicting anomalies in a processing environment.

Referring initially to FIG. 4, a number of modules are depicted. The separation of individual tasks or functionality into modules in the embodiment of FIG. 4 is a non-limiting example of process distribution and is not indicative of the structure of the computer program code or where this code is executed. One of skill in the art will recognize that the functionality of the computer program code can be embodied in one or more physical modules and executed on one or more processors, in one or more servers or one or more computing units. FIG. 4 is provided for illustrative purposes to designate different activities which may be executed by a specially configured computer system, and/or embodied in a computer program product.

Referring to FIG. 4, a predictor module 400 receives input from one or more sensors. For instance, the sensors collect data from one or more of the computing units 112, and provide that data to, for instance, an application, which based on the collected data generates values for one or more metrics. These metrics, referred to as key performance indicators (KPIs), include, for instance, the mean, standard deviation, or other types of metrics computed for each type of collected data. The computed metric values are obtained, e.g., by the sensors from the application, and input to predictor module 400. (As used herein, obtained or forms thereof, include, but are not limited to, for instance, received, provided, had, determined, been forwarded, etc.) The predictor module uses a predictive technique to predict future values of the metrics within an interval (horizon) of time H in the future [t+1, t+2, . . . , t+h]. It produces a new interval of predicted values for each incoming metric.

In one example, the predictor module predicts values at time t for each timestamp in the interval (e.g., t+1 . . . t+h), and then again at the next time (e.g., t+1) for t+2 . . . t+h, etc. Thus, each time in the future, t+1 . . . t+h, has a set of predicted values associated therewith for a metric, in which the set includes one or more predicted values.

The predictor module may use any type of predictive functions, including, for instance, an autoregressive integrated moving average (ARIMA), as well as other techniques. As is known, an autoregressive integrated moving average (ARIMA) model is a generalization of an autoregressive moving average (ARMA) model. These models are fitted to time series data either to better understand the data or to predict future points in the series (forecasting). They are applied in some cases where data show evidence of non-stationarity, where an initial differencing step (corresponding to the "integrated" part of the model) can be applied to remove the non-stationarity.

The model is generally referred to as an ARIMA (p,d,q) model where parameters p, d, and q are non-negative integers that refer to the order of the autoregressive, integrated, and moving average parts of the model respectively.

In one example, given a time series of data $X_t$ where t is an integer index and the $X_t$ are real numbers, then an ARMA (p',q) model is given by:

$$\left(1 - \sum_{i=1}^{p'} \alpha_i L^i\right) X_t = \left(1 + \sum_{i=1}^{q} \theta_i L^i\right) \varepsilon_t$$

where L is the lag operator, the $\alpha_i$ are the parameters of the autoregressive part of the model, the $\theta_i$ are the parameters of the moving average part and the $\varepsilon_t$ are error terms. The error terms $\varepsilon_t$ are generally assumed to be independent, identically distributed variables sampled from a normal distribution with zero mean.

Assume now that the polynomial $$\left(1 - \sum_{i=1}^{p'} \alpha_i L^i\right)$$

has a unitary root of multiplicity d. Then it can be rewritten as:

$$\left(1 - \sum_{i=1}^{p'} \alpha_i L^i\right) = \left(1 - \sum_{i=1}^{p'-d} \phi_i L^i\right)(1-L)^d.$$

An ARIMA (p,d,q) process expresses this polynomial factorisation property with p=p'−d, and is given by:

$$\left(1 - \sum_{i=1}^{p'} \alpha_i L^i\right)(1-L)^d X_t = \left(1 + \sum_{i=1}^{q} \theta_i L^i\right) \varepsilon_t$$

and thus can be thought as a particular case of an ARMA (p+d,q) process having the autoregressive polynomial with d unit roots. (For this reason, every ARIMA model with d>0 is not wide sense stationary.)

The above can be generalized as follows:

$$\left(1 - \sum_{i=1}^{p'} \alpha_i L^i\right)(1-L)^d X_t = \delta + \left(1 + \sum_{i=1}^{q} \theta_i L^i\right) \varepsilon_t$$

This defines an ARIMA (p,d,q) process with drift $\delta/(1-\Sigma\varphi_i)$.

Other types of predictors may be used, including, for instance, exponential smoothing, Holt-Winters, Kalman filter, or any multiple-step ahead time series predictor, etc.

In this example, the predictor outputs one or more metric values for each input metric at t+1, t+2, . . . , t+h. This output of predictor module 400 is input to a tracker module 404, which tracks values in the future that have been predicted. For each timestamp in the future that has a predicted value at time current t, the tracker module computes the average accumulated change of all predictions for a particular timestamp t+h in the future, for all h in the defined horizon. For example, at time t, values are predicted at times t+1, t+2, t+3, . . . , t+h. Then, at time t+1, values are again predicted at times t+2, t+3, t+h, etc. The differences between the values at each time are averaged (e.g., weighted average). For instance, for time t+3, an average accumulated change of the values predicted at t, t+1, and t+2 is computed, which is the prediction trends score for t+3 for a given metric. This is pictorially depicted in FIG. 5A, and mathematically expressed in FIG. 5B, where a is a desired weight and $\hat{y}_{t+h|t}$ is a predicted value of the metric $y_{t+h}$ at time t. There is at least one prediction trends score for each metric.

Further, in one embodiment, the output of the predictor is also provided to a seasonal residual component 406. This component computes for a metric the difference between a predictive value at time t+h and a real value at a season T before t−T+h for all t+h. For instance, a predicted value in time t+h on Monday at 2 pm may be compared to a real value at time t−T+h on Monday at 2 pm a week prior. In one embodiment, a sequence of residuals is computed as the difference between predicted values and the real values one season, T, before. The absolute value of these residuals is the seasonal residuals. Again, the season can be any selected point in time. It is specified by the user and not tied to the data. One example of the determination of seasonal residuals (residual relative to ground-truth one season before) is pictorially depicted in FIG. 6.

Using seasonal data patterns is optional, but may eliminate false anomaly results. For example, while 100 transactions in a given system may be normal at 2 am on a Sunday, this low number could indicate an issue at 2 pm on Monday. If entered, seasonal data representing this condition eliminates a false anomaly result when the number of transactions processed on a Sunday morning, for example, is far less than expected on a Monday afternoon. Thus, in a computer system where time series data varies in accordance with seasonal usage patterns, the seasonal residual module is useful because what might be identified as an abnormal data pattern at a given time, may actually be normal for the time due to seasonal factors. Thus, false anomaly results are reduced through the inclusion of this module. Eliminating seasonal influences increases the accuracy of the data.

Figures 6, 7:
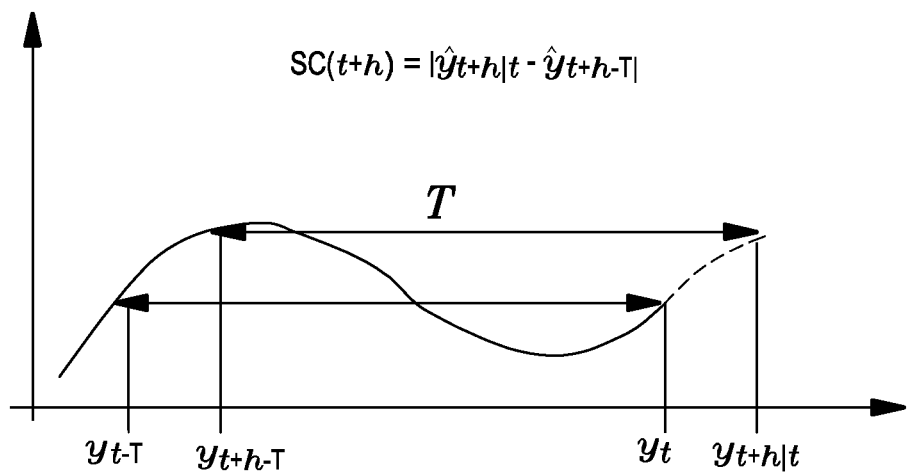
FIG. 6 depicts one embodiment of determining seasonal residuals to be used in predicting anomalies in a processing environment.
FIG. 7 depicts one embodiment of determining an anomaly prediction score to be used in predicting anomalies in a processing environment.

The output of the seasonal residual module 406 is provided to a combination module 408, as well as the output of tracker module 404. Combination module 408 combines the outputs of tracker module 404 and seasonal residual module 406 to obtain predictive scores (a.k.a., anomaly scores) at t+1, t+2, . . . , t+h. For each predicted timestamp t+h for each metric, combination module 408 combines the prediction trends scores from tracker module 404 and the seasonal residuals from module 406 to provide a predictive score for that timestamp for that metric. The combination may be performed by averaging, for each predicted timestamp, the prediction trend score and the seasonal residual, as shown in FIG. 7, or by any other desired combination technique, such as, but not limited to, using a weighted average, using a functional form, such as one learned through an algorithm and/or using data, etc.

The output of combination module 408 is passed to a statistical model module 410, the output of which is a predicted anomaly 412. Module 410 creates a statistical model (anomaly detector) on the anomaly scores in real-time. A detected anomaly at time t on an anomaly score of time t+h points to a future anomaly at time t+h. In one example, the statistical model is a histogram, but other types of statistical models may be used. For instance, the anomaly score is used through a classifier to decide where the system is anomalous at the predicted time in the future. The classifier is based on, for instance, real-time data statistics, such as a means and variance estimator, quartiles, percentiles, etc.; or a functional form (e.g., one learned through a set of data). In one particular example, each anomaly score is compared to a particular value (e.g., quartile, percentile, etc.) to determine based on the comparison or other statistical analysis if an anomaly is to occur at a future time. Other examples are possible.

In one embodiment, an anomaly score is associated with a metric, and each metric is associated with a component. Thus, in one example, by tracking the metric and anomaly score that predicts a future anomaly, a determination is made as to which component of the system will cause a problem in the future (i.e., which component is associated with the predicted anomalous metric). For example, each metric has a corresponding index, and a table, list or other data structure maps the index to a component. Then, when a metric is identified as anomalous in the future, the index of the metric is looked-up in the data structure to determine a corresponding component. An indication of this component is provided, in one example.

Described in detail above is one embodiment of determining an anomaly of a system for a future specified time without knowing the actual state of the system at the predicted future time. In one aspect, the anomaly prediction technique predicts anomalies in a future time without requiring the actual state of the system at the time of interest, without training the system on pre-defined anomalous patterns or symptoms of anomalies, and without requiring prior knowledge or signatures. The anomaly prediction technique is defined on the actual data space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
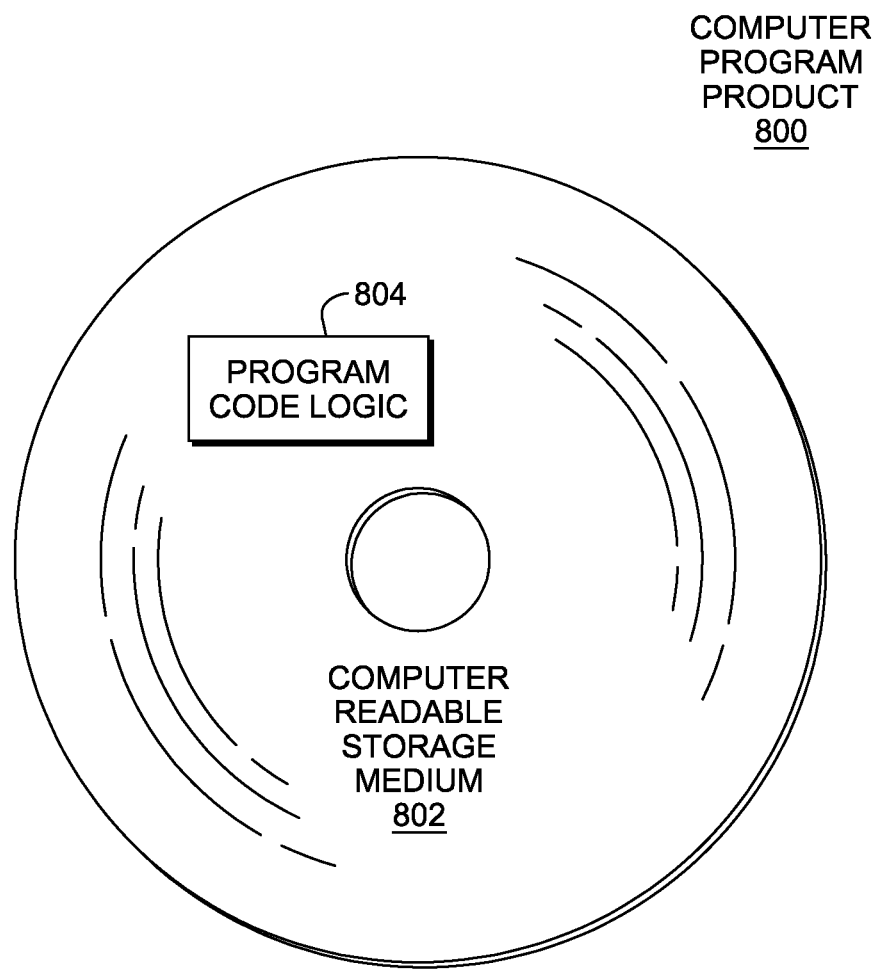
FIG. 8 depicts one embodiment of a computer program product incorporating one or more aspects.

Referring now to FIG. 8, in one example, a computer program product 800 includes, for instance, one or more non-transitory computer readable storage media 802 to store computer readable program code means or logic 804 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects of the present invention. Further, other types of processing environments can use one or more aspects of the present invention. Additionally, instead of using performance data, other types of data may be used to determine other types of anomalies besides computer performance and/or availability issues. The processing environments or systems to be monitored for future anomalies can be any type of environment or system that has time series data. It need not be a computing system that is monitored for future performance or availability issues, but may be other types of processing systems. For instance, it may be a processing system producing time series data, such as medical data, financial data, etc. The list or types of environments or systems are endless. Many variations are possible.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A method of determining an anomalous state within a processing system, said method comprising:

obtaining, by a processor, values for metrics of the processing system, the values being based on data collected from one or more sensors of the processing system, the data regarding performance of computing units of the processing system;

determining, by the processor, sets of predicted values for points in time in the future for the metrics, wherein a set of predicted values for a point in time in the future comprises a plurality of predicted values for the point in time in the future, the plurality of predicted values determined at a plurality of different points in time, wherein the determining is based on the values for the metrics, and wherein the determining the sets of predicted values provides predicted values at times t+1, . . . , t+h, where h represents an amount of time of a time interval;

determining, for the sets of predicted values, change values, wherein a change value for the set of predicted values represents changes in the plurality of predicted values for the point in time in the future, and wherein the determining the change values provides average changes in predicted values at t+1, . . . , t+h; and predicting, by the processor, at a current time, based on the change values, whether an anomalous state of performance of the computing units is expected to exist within the processing system at a future time, wherein the predicting whether the anomalous state is expected to exist comprises combining the average changes at t+1, . . . , t+h with seasonal residuals at t+1, . . . , t+h to provide, in real-time, anomaly scores of t+1, . . . , t+h.

2. The method of claim 1, wherein the predicting comprises determining at a current time t whether the anomalous state is expected to exist at a future time t+h absent knowledge of an actual state of the processing system at future time t+h.

3. The method of claim 1, wherein the determining the change value for the set of predicted values comprises determining an average for the plurality of predicted values of the set of predicted values.

4. The method of claim 1, further comprising:

computing the seasonal residuals, wherein the computing a seasonal residual for a selected time comprises computing a difference between a predicted value at the selected time and a real value at that selected time in a previous season to obtain the seasonal residual for that selected time.

5. The method of claim 1, wherein the predicting further comprises generating a statistical model based on the anomaly scores, the statistical model to be used to predict whether the anomalous state is expected to exist.

6. The method of claim 1, wherein the metrics relate to performance data of the computing units of the processing system.

7. The method of claim 6, further comprising determining the values for the metrics, wherein the determining comprises:

receiving the performance data in time series, the performance data including at least one of a number of transactions per specified time period, an amount of memory used, or a response time; and computing the values based on the received performance data.

8. The method of claim 1, wherein the determining the sets of predicted values uses an autoregressive moving average predictive function with at least some of the values for the metrics to determine at least some of the predicted values of the sets of predicted values.

9. A computer program product for determining an anomalous state within a processing system, said computer program product comprising:
  a non-transitory storage medium readable by a processing circuit and storing instructions for execution by the processing circuit to perform a method, the method comprising:
    obtaining values for metrics of the processing system, the values being based on data collected from one or more sensors of the processing system, the data regarding performance of computing units of the processing system;
    determining sets of predicted values for points in time in the future for the metrics, wherein a set of predicted values for a point in time in the future comprises a plurality of predicted values for the point in time in the future, the plurality of predicted values determined at a plurality of different points in time, and wherein the determining is based on the values for the metrics, and wherein the determining the sets of predicted values provides predicted values at times t+1, . . . , t+h, where h represents an amount of time of a time interval;
    determining, for the sets of predicted values, change values, wherein a change value for the set of predicted values represents changes in the plurality of predicted values for the point in time in the future, and wherein the determining the change values provides average changes in predicted values at t+1, . . . , t+h; and
    predicting at a current time, based on the change values, whether an anomalous state of performance of the computing units is expected to exist within the processing system at a future time, wherein the predicting whether the anomalous state is expected to exist comprises combining the average changes at t+1, . . . , t+h with seasonal residuals at t+1, . . . , t+h to provide, in real-time, anomaly scores of t+1, . . . , t+h.

10. The computer program product of claim 9, wherein the predicting comprises determining at a current time t whether the anomalous state is expected to exist at a future time t+h absent knowledge of an actual state of the processing system at future time t+h.

11. The computer program product of claim 9, wherein the method further comprises:
  computing the seasonal residuals, wherein the computing a seasonal residual for a selected time comprises computing a difference between a predicted value at the selected time and a real value at that selected time in a previous season to obtain the seasonal residual for that selected time.

12. The computer program product of claim 9, wherein the predicting further comprises generating a statistical model based on anomaly scores, the statistical model to be used to predict whether the anomalous state is expected to exist.

13. The computer program product of claim 9, wherein the metrics relate to performance data of the computing units of the processing system, and wherein the method further comprises determining the values for the metrics, wherein the determining comprises:
  receiving the performance data in time series, the performance data including at least one of a number of transactions per specified time period, an amount of memory used, or a response time; and
  computing the values based on the received performance data.

14. A computer system for determining an anomalous state within a processing system, said computer system comprising:
  a memory; and
  a processor in communication with the memory, wherein the computer system is configured to perform a method, the method comprising:
    obtaining values for metrics of the processing system, the values being based on data collected from sensors of the processing system, the data regarding performance of computing units of the processing system;
    determining sets of predicted values for points in time in the future for the metrics, wherein a set of predicted values for a point in time in the future comprises a plurality of predicted values for the point in time in the future, the plurality of predicted values determined at a plurality of different points in time, and wherein the determining is based on the values for the metrics, and wherein the determining the sets of predicted values provides predicted values at times t+1, . . . , t+h, where h represents an amount of time of a time interval;
    determining, for the sets of predicted values, change values, wherein a change value for the set of predicted values represents changes in the plurality of predicted values for the point in time in the future, and wherein the determining the change values provides average changes in predicted values at t+1, . . . , t+h; and
    predicting at a current time, based on the change values, whether an anomalous state of performance of the computing units is expected to exist within the processing system at a future time, wherein the predicting whether the anomalous state is expected to exist comprises combining the average changes at t+1, . . . , t+h with seasonal residuals at t+1, . . . , t+h to provide, in real-time, anomaly scores of t+1, . . . , t+h.

15. The computer system of claim 14, wherein the predicting comprises determining at a current time t whether the anomalous state is expected to exist at a future time t+h absent knowledge of an actual state of the processing system at future time t+h.

16. The computer system of claim 14, wherein the method further comprises:
  computing the seasonal residuals, wherein the computing a seasonal residual for a selected time comprises computing a difference between a predicted value at the selected time and a real value at that selected time in a previous season to obtain the seasonal residual for that selected time.

* * * * *